Figure 1:
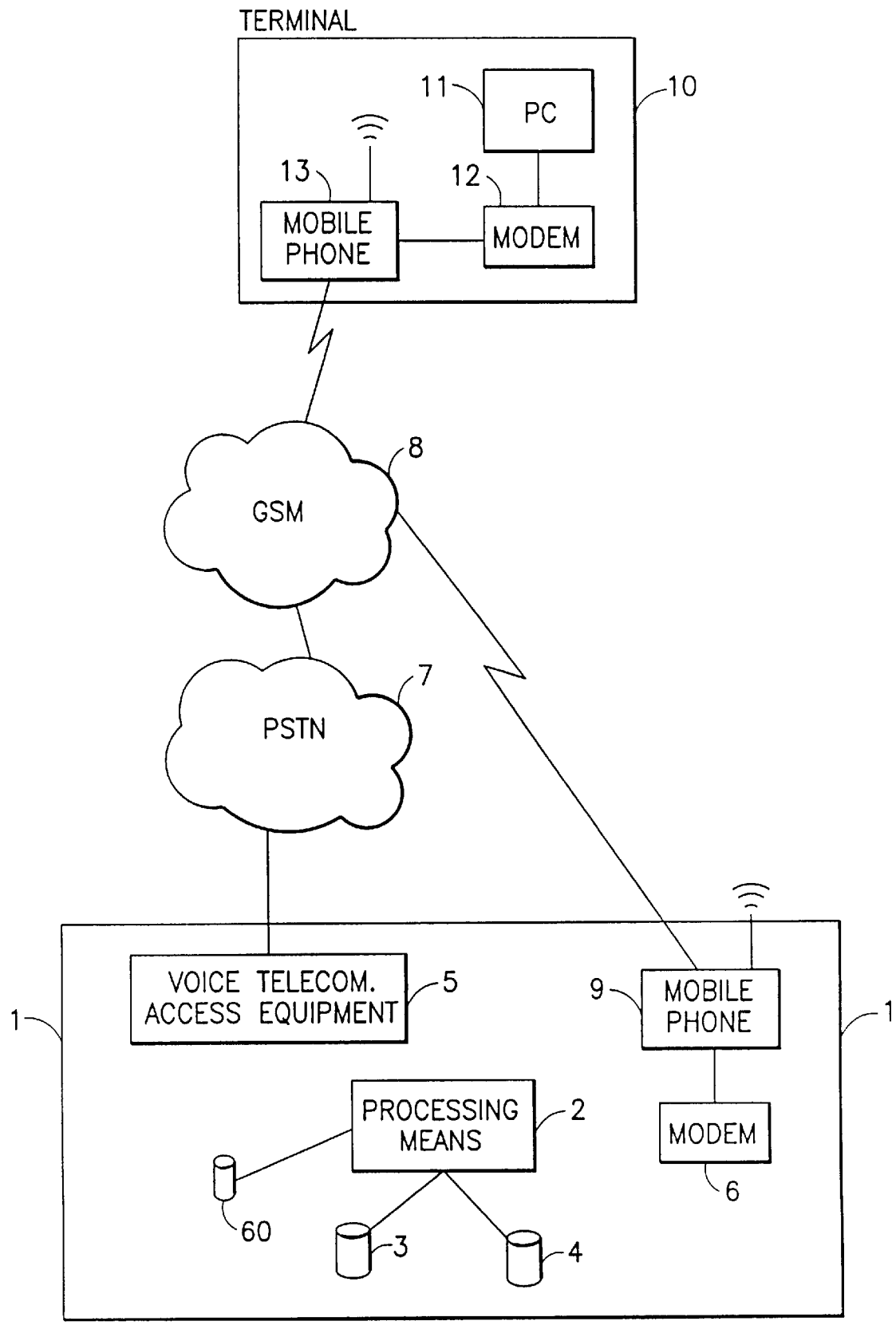

United States Patent [19]

Coiera et al.

[11] Patent Number: 5,949,866
[45] Date of Patent: Sep. 7, 1999

[54] COMMUNICATIONS SYSTEM FOR ESTABLISHING A COMMUNICATION CHANNEL ON THE BASIS OF A FUNCTIONAL ROLE OR TASK

[75] Inventors: Enrico Guglielmo Coiera, Bath, United Kingdom; Ajay Gupta, Delhi, India

[73] Assignee: Hewlett-Packard Company, Palo Alto, Calif.

[21] Appl. No.: 08/803,058

[22] Filed: Feb. 19, 1997

[30] Foreign Application Priority Data

Mar. 11, 1996 [EP] European Pat. Off. .............. 96301643

[51] Int. Cl.⁶ .......................... H04M 3/42; H04M 1/64; H04B 13/02
[52] U.S. Cl. ......................... 379/210; 379/211; 379/201; 379/212; 379/88.15; 455/426; 455/445
[58] Field of Search .................................... 379/210, 211, 379/212, 201, 207, 217, 67.1, 88.15, 265; 455/426, 445

[56] References Cited

U.S. PATENT DOCUMENTS

| 5,329,578 | 7/1994 | Brennan et al. ........................ 379/196 |
| 5,465,082 | 11/1995 | Chaco ................................. 340/825.54 |
| 5,754,636 | 5/1998 | Bayless et al. .......................... 379/201 |

FOREIGN PATENT DOCUMENTS

| 0 588 646 A2 | 3/1994 | European Pat. Off. . |
| 3443472-A1 | 11/1984 | Germany . |
| WO 83/03510 | 10/1983 | WIPO . |
| WO 94/23525 | 10/1994 | WIPO . |

OTHER PUBLICATIONS

C.J. Boltjes, "Facilities for Users of SOPHO–SET Feature Phones", Philips Telecommunications Review, vol. 48, No. 1, pp. 20–27.

Siemens Product Data—HICOM 600 System, 1988, pp. 18–19.

Abstract for Japanese Patent No. A 63131763 to Kojo for "Absence Transferring and Registering System", published Mar. 6, 1988.

Abstract for Japanese Patent No. A 61009069 to Yasuo for Subscriber Selection Service Control System:, published Jan. 16, 1988.

Primary Examiner—Harry S. Hong
Assistant Examiner—Benny Q. Tieu

[57] ABSTRACT

A communications system is provided having first storage means for storing a role identifier identifying a functional role, the names of one or more people able to fulfill such a functional role, and a contact number for each person, input means for accepting a request in the form of a role identifier for communication with a person fulfilling a given role, second storage means for storing a set of instructions for each role identifier, and processing means for accepting a role identifier, accessing such first and second storage means, and establishing a communications channel with a person able to fulfill the functional role associated with the role identifier, via said current contact number in accordance with said set of instructions. The present invention thus provides an efficient role based communications system, which ensures communication with an individual who, at the present time, is fulfilling a certain role.

18 Claims, 9 Drawing Sheets

*Sister I. Gomez*  *Palmtop Communicator*  11/25/95  6:33pm

CODE IN PROGRESS

Code Called: 6:31pm
Code Team

| | Role | Called | Acknowledged | Location |
|---|---|---|---|---|
| Dr P Baraclough | Anaesthetist | Y | | Maternity |
| Dr S Trowell | RMO | Y | N | Main building |
| Dr V Vishnu | SRMO | Y | Y | Main building |
| Dr X Wized | Surgical Reg | Y | Y | Main building |

| Help | Record | Guideline | | | | | Cancel | Call | CODE |
|---|---|---|---|---|---|---|---|---|---|
| F1 | F2 | F3 | F4 | F5 | F6 | F7 | F8 | F9 | F10 |

*Fig. 8*

COMMUNICATIONS SYSTEM FOR ESTABLISHING A COMMUNICATION CHANNEL ON THE BASIS OF A FUNCTIONAL ROLE OR TASK

The present invention relates to a communications system, and in particular a communications system for establishing communication channels on the basis of a functional role or task.

Most communications systems are designed to facilitate communication with a named person. Thus, known telephone systems and voice mail systems associate a contact number with a person, and are designed so that a user of the system inputting a given contact number is connected with the associated person, if necessary by means such as call forwarding. Recent developments in telecommunications systems have been aimed at strengthening the linkage between contact numbers and individuals, for example the concept of a universal personal number has been developed. A universal personal number communications system aims to guarantee communication with a named individual by the use of his personal number, which is translated by the communications system to one of a plurality of conventional contact numbers. Thus a universal personal number input into such a communications system may for example be translated to a home telephone number, an office telephone number, or a mobile telephone number dependent on the current location of the owner of the universal personal number.

While such communications systems aid communication with individuals, known communications systems do not facilitate efficient communication based on role or task. There are a number of environments in which efficient communication based on role or task are desirable, for example the medical environment. This environment will be utilised to describe the present invention, although it will be appreciated that applications of the present invention are not limited to this environment.

In a hospital there are a number of roles that need to be fulfilled, for example anesthetist, cardiac specialist, nurse, orderly, accident and emergency specialist etc. These roles are fulfilled by individuals, often for defined periods of time, when they are "on call". Thus responsibility for the role passes between individuals, responsibility may be with more than one individual, or one individual may be responsible for more than one role. Presently, communication in such an environment is often achieved by the use of a wireless paging system. For example, roles are associated with individual pagers, and pagers are physically passed between individuals when responsibility for the associated role changes. This system suffers from a number of disadvantages. If an individual is unable to fulfill his role, separate provision must be made for communicating with a second individual also able to fulfill this role. If an individual should be simultaneously fulfilling more than one role he will need to carry the equivalent number of pagers.

According to the present invention there is provided a communications system comprising first storage means for storing a plurality of records, each record comprising at least three fields:
  a role field for storing a role identifier, identifying a functional role,
  a name field for storing for each said role identifier one or more names of people able to fulfill said functional role, and
  a number field for storing for each said person a current contact number, input means for accepting a request in the form of a role identifier for communication with a person fulfilling a given role, a second storage means for storing a set of instructions for each said record, and processing means for accepting a role identifier, accessing said first and second storage means and establishing a communications channel with a person able to fulfill the functional role associated with the role identifier, via said current contact number in accordance with said set of instructions.

The present invention thus provides an efficient role based communications system. Rather than ensuring communication with a named individual, the present Communications system aims to ensure communication with an individual who, at the present time, is fulfilling a certain role. Thus the communications system accepts a request from a user of the system in the form of a role identifier. The user is unlikely to know the name or contact number of the person currently fulfilling the desired role. This information is held by the communications system which holds for each role identifier, for example, cardiac specialist on call, a list of names, in priority order, of people able to fulfill this role at the present time. In use, the communications system will attempt to contact the first listed person able to fulfill the requested role via said person's current contact number. A personal numbering scheme could be utilised to ensure successful communication with the current cardiac specialist i.e. the number field of a record according to the present invention could be updated via a known universal personal number system. However, generally the person fulfilling a given role will be within a known environment, for example a hospital, and will be near, or carry, a single communications device through which he can be reliably contacted. It will be appreciated that the term "current contact number" includes for example a phone number, an e-mail address, a pager number, a facsimile number, an internet address or any other form of contact number.

Preferably the present communications system further comprises editing means which is accessible via a communications channel by subscribers of the system. "Subscriber" will be used herein to designate a person whose name is entered in a name field of a record according to the present invention, and "user" will be used to designate a person utilising the present communications system to communicate with a subscriber. The provision of such editing means allows subscribers of the system to for example, associate themselves with different roles, or to alter their availability to perform one or more roles.

Preferably, the set of instructions for a record comprising a name field having a plurality of names, will cause the communications system to attempt to establish a communication channel with each of the plurality of names until one such attempt is successful. Thus, if the first person named in a name field under a given role identifier is unavailable, the communications system will attempt to contact the second named person able to perform the same functional role.

Preferably upon establishing a communications channel, the processing means passes a role identifier along the communications channel. The subscriber thus contacted by the communications system will know immediately the role in which he has been contacted. The subscriber can then either accept his responsibility to carry of the communicated role, or, for example if the subscriber is engaged in duties associated with a further role, he can send a negative response to the communications system. In this case, the communications system will attempt to contact another subscriber able to fulfill the same role.

In a number of environments it is desirable to contact a team of people, each of whom perform a specified role, thus the present invention advantageously provides storage means comprising at least one record having a plurality of role identifiers and a fourth team field for storing a team identifier. Upon receipt of a team identifier the communications system will establish communication channels with people able to fulfill each of the functional roles identified by the role identifiers associated with the input team identifier. Thus, for example, a user can input a team identifier such as "cardiac team" to the communications system, and people presently fulfilling a number of roles e.g. "cardiac specialist", "paramedic", "nurse", will be contacted by the communications system. Should the first named person fulfilling any one role be uncontactable, or unable to attend, the communications system will attempt to contact the second named person in the name field associated with the appropriate role identifier. Thus, embodiments of the present invention allow teams of appropriately skilled people to be reliably and efficiently assembled in response to a single input to the communications system by a user.

Communications systems according to the present invention may establish solely voice communication channels, or solely data communication channels., however preferably both voice and data communication channels are established.

Figure 2:
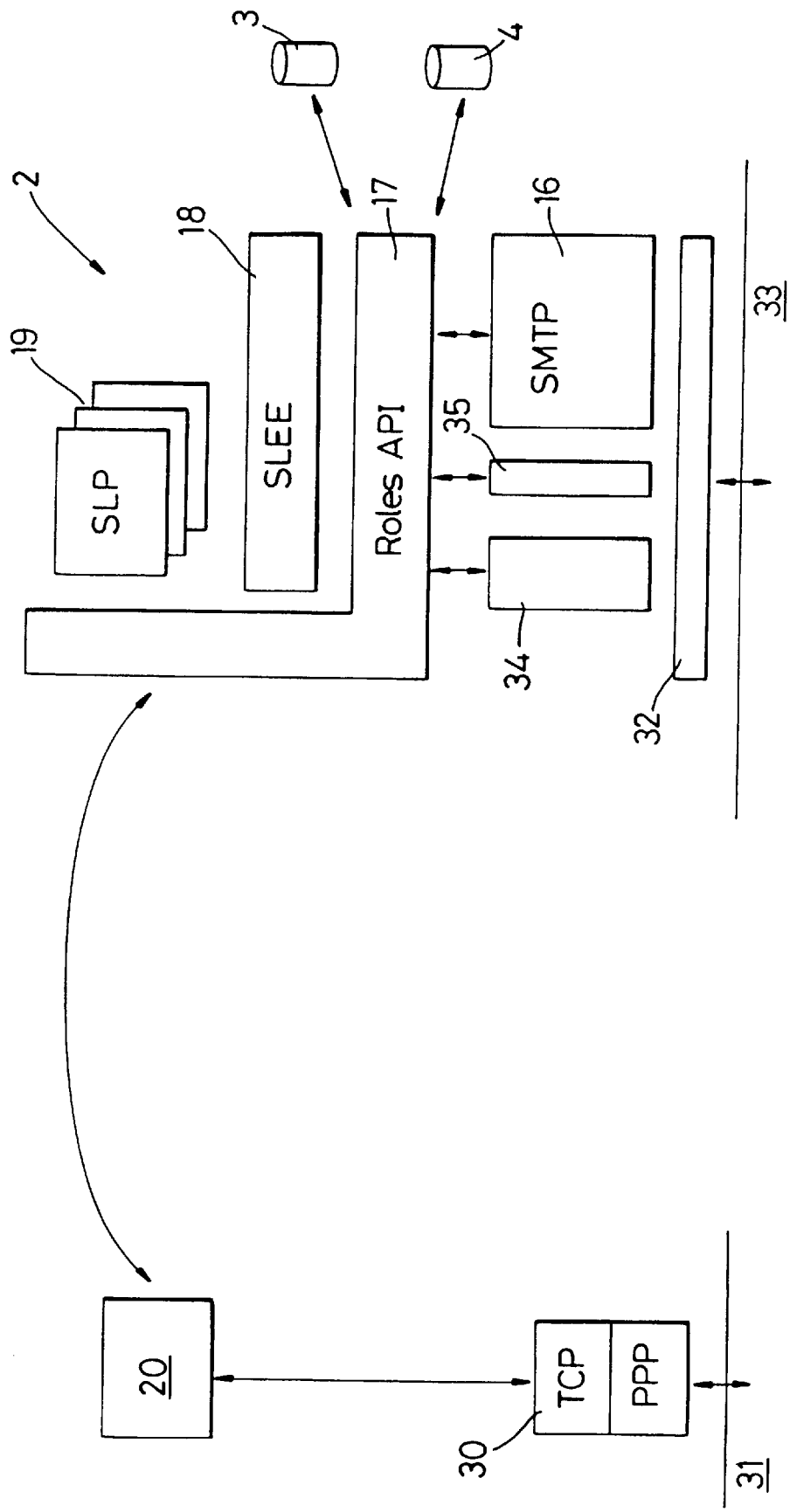
Figure 3:
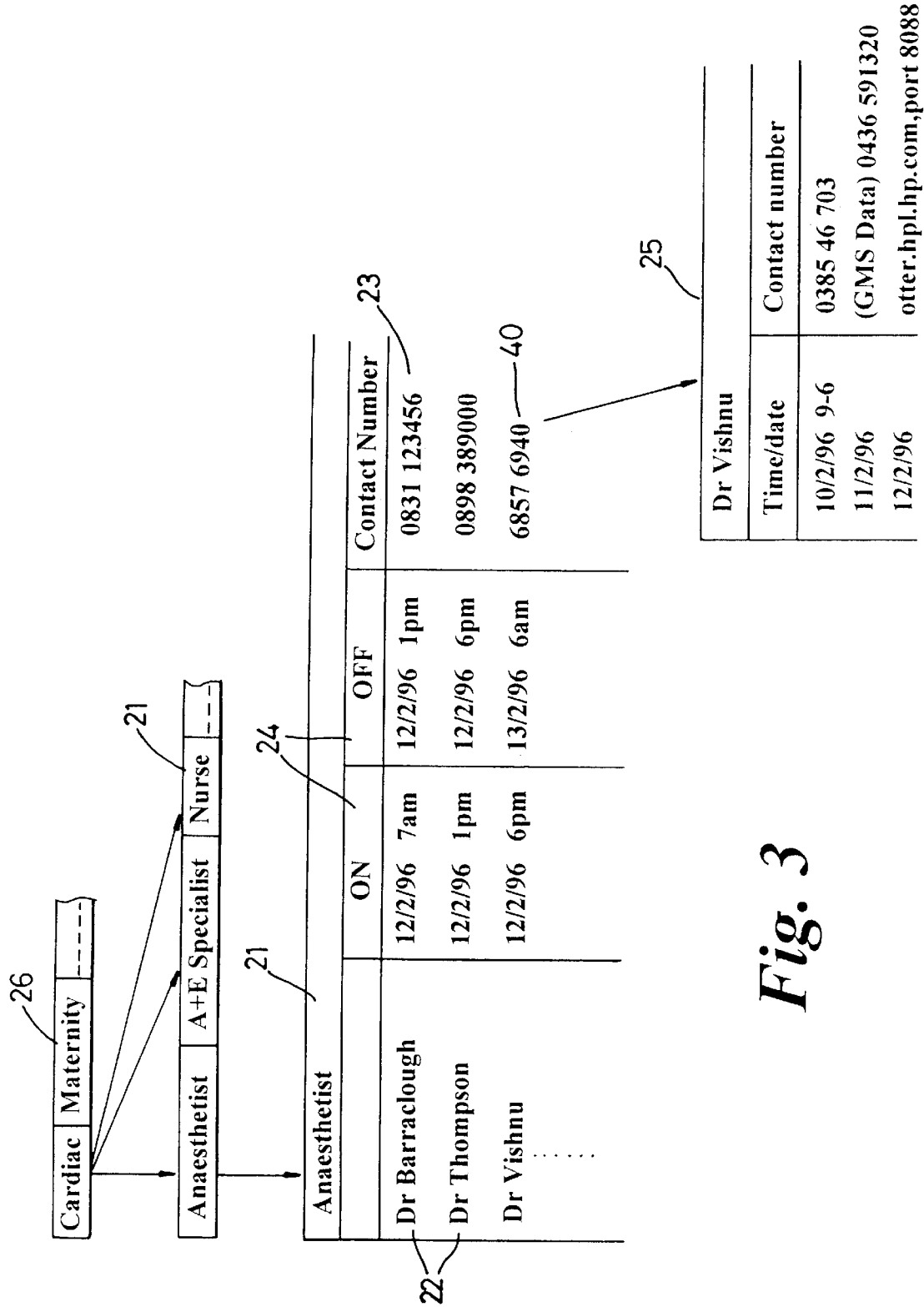

Embodiments of the present invention will now be described, by way of example only, and with reference to the following drawings:

FIG. 1 is a schematic representation showing a communications system according to an embodiment of the present invention, FIG. 2 is a schematic representation of the client and server software utilised in a communications system according to an embodiment of the present invention, FIG. 3 shows the structure of data relating to functional roles, held on a database according to an embodiment of the present invention.

Figure 4:
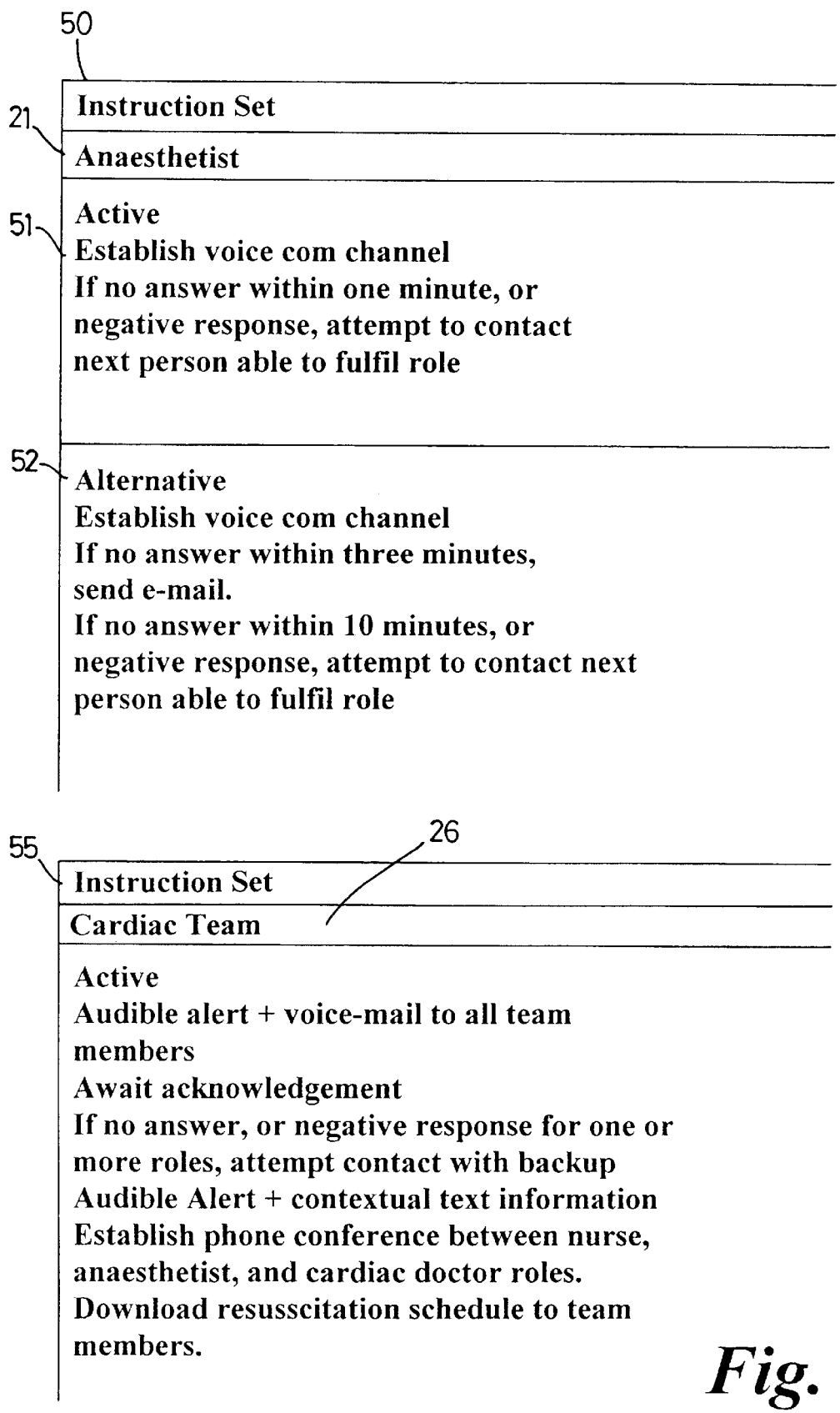

FIG. 4 shows the structure of data, relating to instruction sets for contacting people fulfilling specified roles, stored on a database according to an embodiment of the present invention, FIGS. 5, 6, 7, 8 and 9 show screen displays from a terminal carried by users or subscribers of a communications system according to an embodiment of the present invention.

An embodiment of the present invention will be described which utilises a voice and data communications structure based on GSM (Global System for Mobile Communications). GSM is emerging as the de facto global digital standard for mobile telephony, and in addition to voice communications supports data communications via SMS (Short Message Service) and via a data channel. It will however be appreciated by those skilled in the art, that alternative voice and/or data communication infrastructures can be utilised, for example DCT (Digital Cordless Telephony).

The present embodiment utilises a client-server computer architecture in which software running on client devices interacts with software running on a server. FIG. 1 schematically shows a server 1, comprising processing means 2 having access to a database 3 of records, and a database 4 of instruction sets. Although databases 2 and 3 are depicted as separate, they may share the same physical or logical storage medium. Server 1 further comprises voice telecommunication access equipment 5, comprising a Network Interface card, a Voice card (Dialogics D/320 SC) and a Conferencing card (Dialogics MSI/80 SC) available from Dialogic at 1515 Route 10, Porsippany N.J. 07054-4596, USA. The server 1 is connected to a PSTN 7 (Public Switch Telephone Network) via the voice access equipment 5, and is connectable to a mobile telephone network 8 via a PCMCIA cellular modem card 6 and a mobile phone 9.

Each subscriber of the present communication system carries a communication device, or terminal 10, comprising a palm top PC II, a PCMCIA cellular modem card 12 and a mobile phone 13. The palm top PC 11 is a Hewlett-Packard 200LX, having a keyboard for data input, and a LCD screen for display purposes. The mobile phones 13 and 9 are Nokia 2110 GSM phones, and the PCMCIA data card is a Noka type DTP-2 data card. The terminal 10 is able to send and receive information via the GSM voice or data channel, or via the GSM SMS, in a manner known to those skilled in this art.

The present embodiment utilises Microsoft DOS software running, on the palm top PC 11, and Microsoft Windows NT software running on the processing means 2, to establish a client-server relationship between the server 1 and the terminal 10 in a manner which will be readily appreciated by those skilled in this art, but which will now be described in some detail.

With reference to FIG. 2, the palm top PC 11 of each terminal 10 runs a communication protocol stack 30 comprising TCP (Transport Communication Protocol) over PPP (Point to Point Protocol). The PPP layer interfaces with the DOS op rating system 31 of the palm top PC 11. Logically above the communication protocol stack 30, the palming top PC 11 runs client software 20 for interfacing with the server 1. The server processing means 2 also runs a communication protocol stack 32 which interface with the NT operating system 33, comprising TCP running over PPP. Logically above the communication protocol stack, the server processing means 2 runs a suite of software libraries that provide APIs (Application Programmer Interfaces) which facilitate communication in a number of formats. The SMTP API 16 provides for communication via E mail, the voice processing, and voice Conferencing API 34 provide for various forms of voice communication over the PSTN 7, and the GSM API 35 provides data communicator over the GSM network 8. A key aspect is the Roles software 17 which interacts with the databases 3 and 4. Also provided within the server 1 are an SLEE 18 (Service Logic Execution Environment), which provides housekeeping functions, and several SLPs (Service Logic Program) 19 which interact with the client software 20.

The setting up of a communications channel between a terminal 10, and the server 1 will now be described. A communications channel may be either connectionless, for example via the GSM SMS, or connection-oriented, for example via the GSM voice channel or data channel, or via a PSTN line. A GSM SMS connection will first be described. The client software 20 running on the terminal 10, in response to a user input, assembles a packet of information that can be interpreted by the SLP 19 running on the server 1. The packet of information contains data identifying the target SLP 19, a role identifier, and data identifying the particular instance of communication between the client software 20 and the server 1. If the user of the terminal 10, wishes their identity or role to be forwarded to the person they are contacting, the packet of information also contains data identifying the person or role initiating the communication. The client software 20 then looks up the short message number (mobile telephone number) of the mobile phone 9 of the server 1, and uses this and the assembled packet to assemble a short message and passes this short message to the PCMCIA card 12. The PCMCIA card 12 interacts with the mobile phone 13 of the terminal 10 and passes the SMS message to the GSM network 8 in a conventional manner. This is then delivered to the server 1 via the mobile phone 9 and PCMCIA drive 6. On arrival at the server 1 resident short message communication software will transfer the contents of the short message to the SLEE 18, which will deliver the role identifier(s) to the SLP 19. The SLP 19 will then attempt to establish communication with the person fulfilling the role given by the role identifier, in a manner to be described below. Communication with the destination role client software, and the originating client software continues via the SMS communication mechanism described above.

Alternatively, a TCP pipeline may be set up between the client software 20 of the terminal 10, and the SLP 19 of the server 1. In this case, the client software 20 triggers PPP software 30 which dials the server 1, either via a GSM data channel, or via the PSTN 7. Once the access equipment 5 of the server 1 detects a carrier, a modem connection is established, and the server 1 initializes PPP software 33 to negotiate with the PPP software 30 run by the client 20. Once a PPP protocol stack has been set up, and an end to end PPP connection established, a TCP channel is established. A packet of information, as described above, can then be exchanged between the client software 20 and the SLP 19 utilising this TCP connection.

The database 3 comprises records of subscribers to the communication system. FIG. 3 is a schematic representation of records stored on database 3. The record comprises a role identifier 21 e.g. "cardiac specialist" and associated with each role identifier a prioritised list of personal identifiers 22, identifying people able to perform the specified role. Associated with each personal identifier 22 is a contact number 23, and a time period 24 during which that particular person is fulfilling the given role. Alternatively, the contact number 23 may comprise a personal number 40 which points to a personal ID record 25 which stores contact numbers in association with time of day, for a particular person. The database 3 also stores team identifiers 26, each of which point to a plurality of role identifiers 21.

Two applications of the present embodiment will now be described. Firstly, the use of the communication system to contact one person, fulfilling a specified role will be described, and secondly the use of the communication system to contact a team of people each of whom fulfill a specified role will be described.

The user of the system, for example a nurse at a hospital, wishes to contact the person presently fulfilling a certain role, for example that of anaesthesia. The nurse accesses the communication system via the PSTN 7 or GSM Network 8, and passes a role identifier 21, identifying "anesthetist on call" to the communication system. The nurse is likely to utilise a terminal 10 to access the communication system, but could alternatively utilise a conventional telephone, in which case DTMF signals are employed to pass the role identifier to the communications system. The Roles software 17 accesses the database 3 and extracts the record having a role identifier 21 which matches "anesthetist on call". From this record the Roles software 17 determines that Dr. Barraclough is the "Anesthetist on call" at the present time, and that his current contact number 23 is 0831 123456. The Roles software 17 also accesses the database 4 of instruction sets. An example of an instruction set 50 for the role "anesthetist on call" is shown in FIG. 4. The current instruction set 51 for "anesthetist on call" requires the Roles software 17 to wait for one minute for a response from Dr. Barraclough and, if no answer, or a negative response is received, to attempt to contact the second on call anesthetist, Dr. Thompson, listed in the role identifier record 21 for the current time. It will be appreciated that many other instruction sets can be envisaged, for example an alternative instruction set 52 shown in FIG. 4, causes the Roles software 17 to await a response for 3 minutes and if no answer is received to send an E mail message to Dr. Barraclough, and wait a further 10 minutes for an answer before attempting to contact Dr. Thompson.

Figure 5:
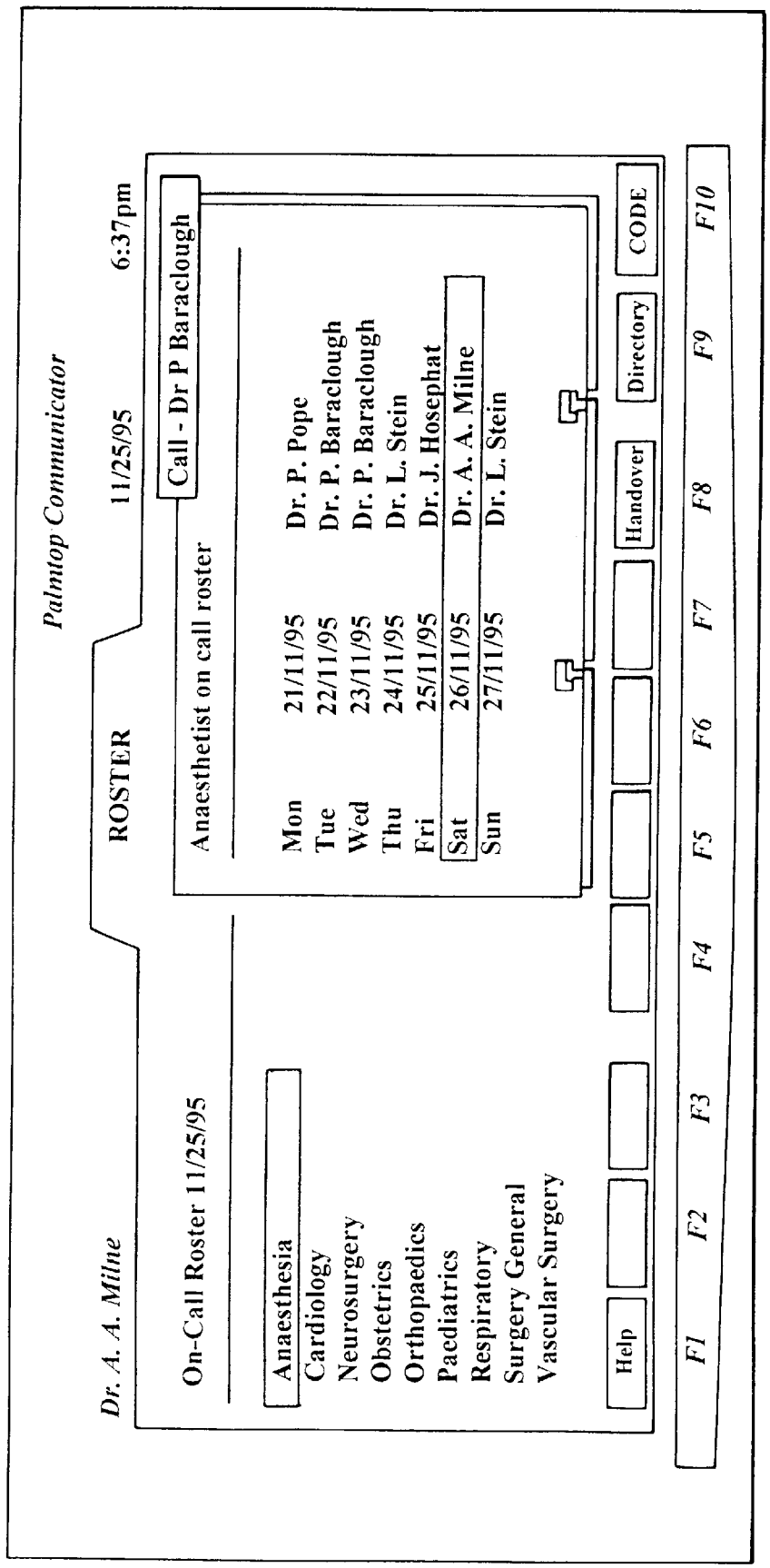

The nurse is thus able to successfully contact the "anesthetist on call", or if he is unavailable, his emergency stand in, without knowing the names or current contact numbers for either of these people. FIG. 5 shows an example of a screen display that the nurse may see on her communication device 10 when attempting to contact the "anesthetist on call". A further feature of the present embodiment is that location information can be gathered from the GSM mobile network 8 by the processing means 2, for each terminal 10. This information is based upon the CSM cell within which the terminal device 10 is presently located, and can be used for example to display the current location of Dr. Barraclough to the nurse who is attempting to contact the "anesthetist on call".

This information can be utilised by the nurse to decide whether to interrupt Dr. Barraclough by attempting to establish voice communication with him, or whether to send an E mail message to his terminal 10.

A further feature of the present embodiment, based on the central storage of information regarding the time schedule of roles to be fulfilled, is the ability to interactively change this schedule of roles. For example, with reference to FIG. 5, Dr. Milne may wish to swap on-call shifts with Dr. Barraclough. Dr. Milne establishes a voice call with Dr. Barraclough, selects the shift he wants to hand over to Dr. Barraclough, and after his agreement, implements the shift hand-over by editing the time periods associated with the "anesthetist on call" record stored in database 3. Preferably, such editing of information held on records is subject to rules stored in the instruction set associated with the particular record, stored in database 4. These rules are set and maintained by the hospital administration. Thus the instruction set associated with the "anesthetist on call" role may limit the editing of the associated record to ensure that only qualified people, who have not fulfilled the role within the last 24 hours, can replace the current "anesthetist on call".

The processing means 2 may, in addition to database 3 and 4, have access to further databases, possibly external to the server 1 which may store for example medical records. Thus, users of the present communication system may contact a person fulfilling a particular role, for example radiologists, and during a voice communication with said person, access laboratory results on a particular patient.

The use of a communications system according to the present intention to assemble a team of people, each fulfilling a specified role, will now be described. The example employed to describe this use will be that of an emergency situation in clinical care. It will be assumed that a member of staff in a hospital witnesses an emergency, such as a cardiac arrest, and summons a pre-specified team of doctors via a communications system according to the present embodiment. In addition to assembling the pre-specified team of doctors, the communications system may also provide information specific to the nature of the emergency which will help the team to deal with the emergency. On witnessing a cardiac arrest a nursing sister, carrying a communication terminal 10 starts the emergency application by pressing a single button to call the "cardiac team". The software running on the terminal 10 packages a team identifier, identifying the "cardiac team" into a SMS message, and sends this message, via the PCMCIA card 10 and the mobile phone 13 to the GSM mobile network 8. The SMS message is handled in the conventional manner by the GSM mobile network 8, and is passed to the mobile phone 9 of the server 1. The processing means 2 extracts the team identifier from the SMS message and accesses the database 3 of records, and the database 4 of instruction sets. Once the received team identifier has been matched with a stored team identifier 26, the role identifiers 21 associated with this team identifier 26 are accessed by the processing means 2. In addition to storing an instruction set 50 associated with each role identifier, the storage means 4 also stores an instruction set 55 associated with each team identifier 26. The processing means 2 thus attempts to contact the team members identified by the team identifier 26, in accordance with the instruction set 55 for the team identifier.

Alternative forms of communication between the person initiating the emergency procedure, and the members of the team are possible. For example, real time voice communication may be utilised by the nursing sister to speak to each member of the team individually, or together. Alternatively voice messaging may be utilised in which the nursing sister leaves a voice mail message which is accessible by all members of the team. Alternatively an E mail message may be sent to the terminal 10 of each team member, with an audible warning.

Figure 6:
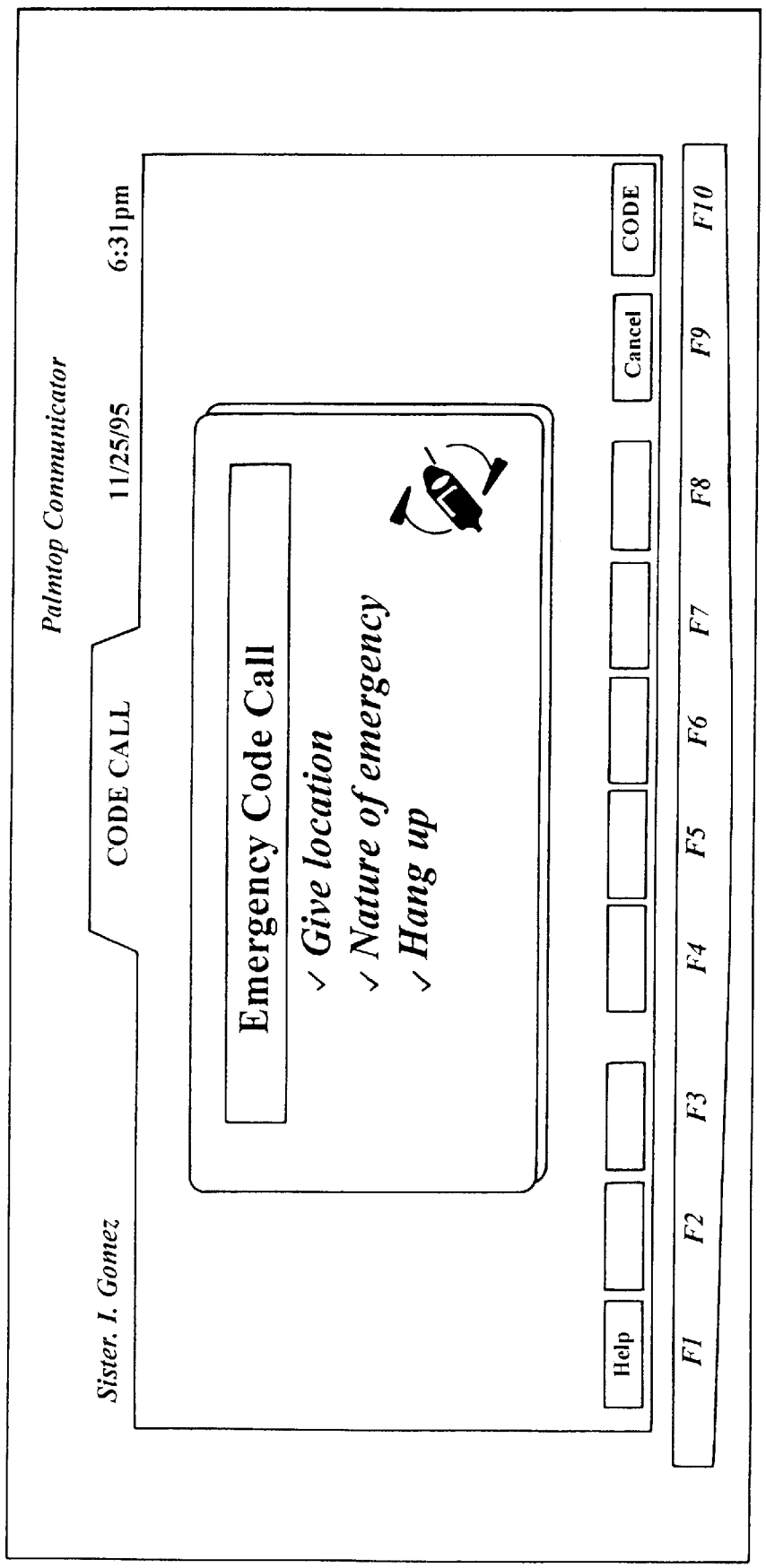
Figure 7:
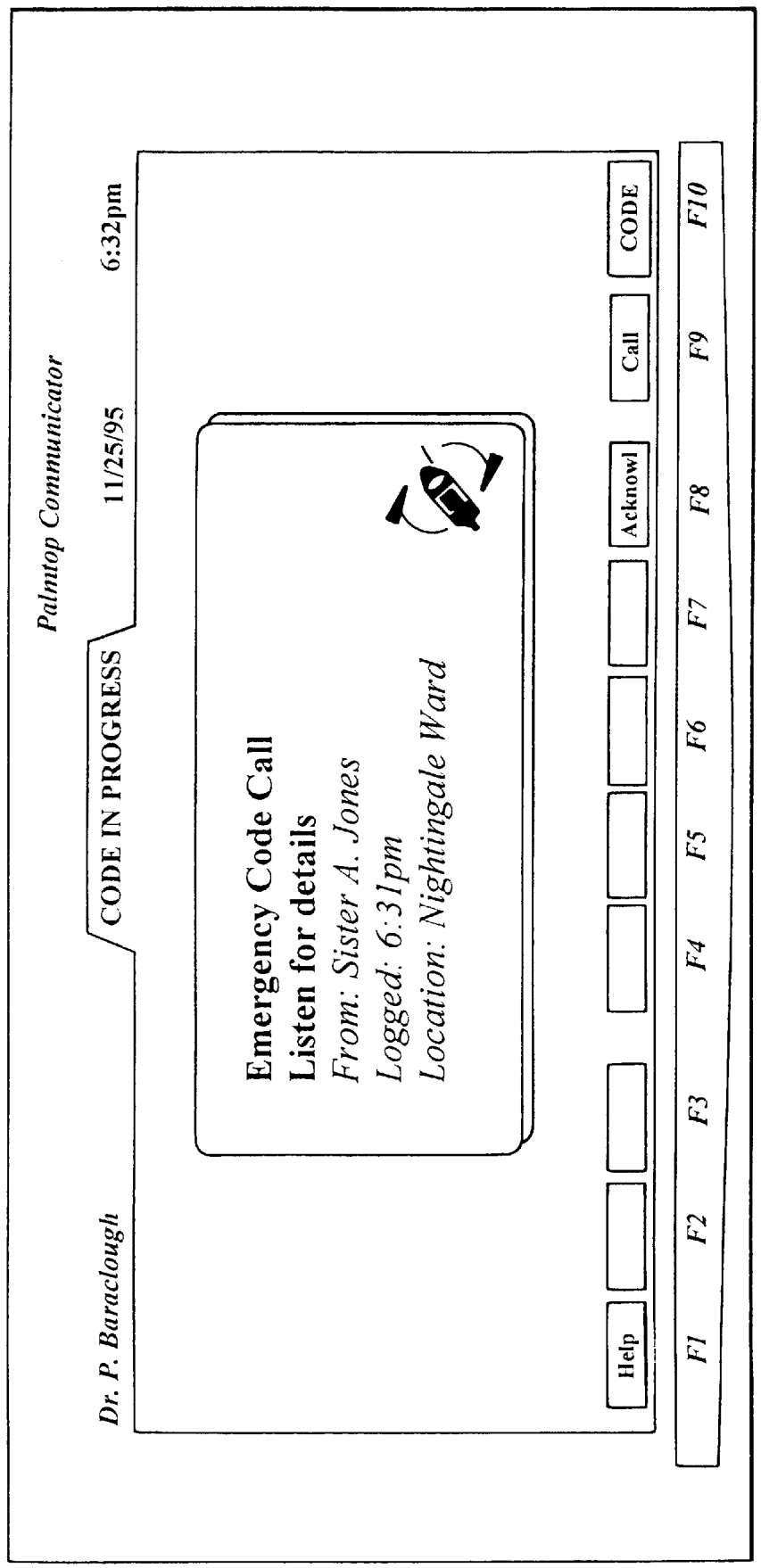

The following description relates to one possible form of communication used in an emergency application. FIG. 6 shows the screen display of the terminal 10 of the nursing sister initiating the emergency application. Having launched the emergency application the nurse is prompted by a text message to ensure she gives the correct information. A voice message is recorded giving the nature of the emergency and the location. The communications system calls each of the team members, in the manner described above, and plays the recorded voice message from the nursing sister. Text information regarding the originator of the emergency application, and the location of the emergency is displayed on each team member's terminal 10, as shown in FIG. 7. Each team member must acknowledge receipt of the message, and their ability to fulfill their role. If a team member indicates that they are unable to attend the emergency, or if there is no response from a team member, the communications system attempts to contact the second person able to fulfill this role within the team, during this time period, in accordance with the instruction set associated with the particular role identifier. This second person, acting as a back-up, is sent text information indicating the nature of the call eg. the role in which they are being contacted and the reason (first on call person not available). Since the back-up person will not be expecting such a call this information will facilitate rapid communication once voice contact with another team member is established.

While the communications system is attempting to contact the members of the team, information is displayed on the terminal 10 of the person initiating the emergency application, which enables them to manage the emergency event. FIG. 8 shows the display of the terminal 10 of the nursing sister. The screen displays the team members, the role they are fulfilling, their current location, whether they have been called yet, and whether they have acknowledged. Should one of the members of the team refuse to accept their role, or be uncontactable, the communications system will update the display as it attempts to contact other people able to fulfill this role.

During the assembly of the team, any team member, or the emergency call initiator, may establish voice communication with one or more of the other team members.

The emergency call initiator manages the assembly of the team members, and this management role may be transferred to any one of the team members. In this case, the summary information shown in FIG. 8 is displayed on the terminal 10 of the current manager of the emergency event.

Figure 9:
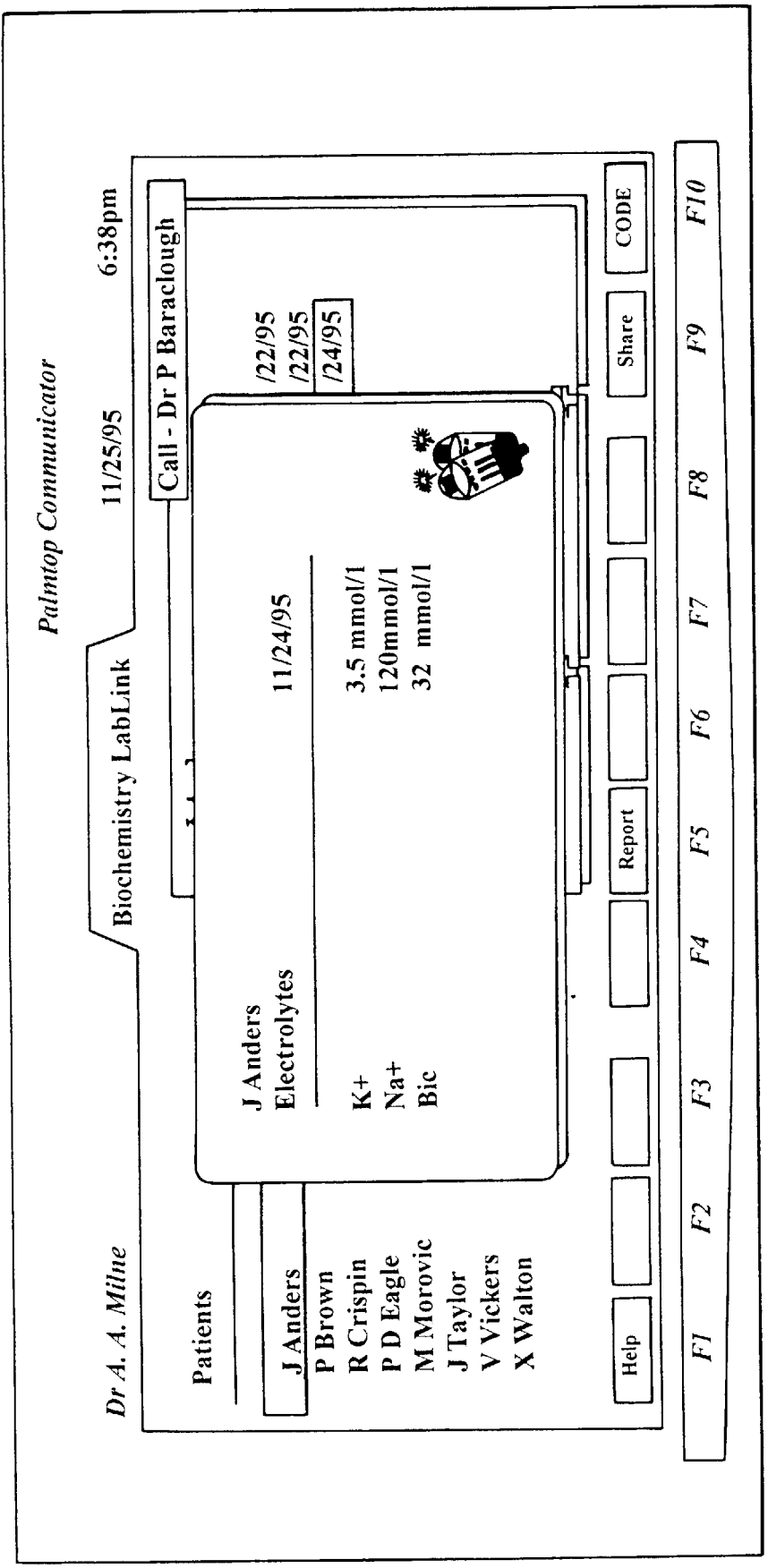

During the emergency event information from a further database 60 (shown in FIG. 1) may be accessed by the team. This information may for example relate to procedures to be carried out during the emergency or may be detailed information for example on quantities of drugs to be administered, or the medical record of a patient. An example of a display of such information on a terminal 10 is shown in FIG. 9.

We claim:

1. A communications system comprising:
   first storage means for storing a plurality of records, each record comprising at least three fields:
   a role field for storing a role identifier, identifying a functional role,
   a name field for storing for each said role identifier one or more names of people able to fulfil said functional role, and
   a number field for storing for each said person a current contact number,
   input means for accepting a request in the form of a role identifier for communication with a person fulfilling a given role,
   a second storage means for storing a set of instructions for each said record, and
   processing means for accepting a role identifier, accessing said first and second storage means and establishing a communications channel with a person able to fulfil the functional role associated with the role identifier, via said current contact number in accordance with said set of instructions.

2. A communications system as claimed in claim 1, wherein at least one record comprises a time field associated with each name field for storing a time period during which the named person is available to fulfil the associated role.

3. A communications system as claimed in claim 1, further comprising editing means for altering said records.

4. A communications system as claimed in claim 3, wherein said editing means is accessible via a communications channel, and is configured to enable a person whose name is entered in a name field to edit the associated record.

5. A communications system as claimed in claim 4, wherein the editing means is further configured to enable said person to edit the instruction set associated with said record.

6. A communications system as claimed in claim 1, wherein the set of instructions for a record comprising a name field having a plurality of names causes the communications system to attempt to establish a communications channel with each of the said plurality of names until an attempt is successful.

7. A communications system as claimed in claim 1, wherein the processing means, upon establishing a communications channel, passes a role identifier along said communications channel.

8. A communications system as claim in claim 1, wherein the processing means comprises channel monitoring means for monitoring an open communications channel for a response from a contacted person.

9. A communications system as claimed in claim 8, wherein the processing means upon receiving a negative response from a contacted person associated with a particular role identifier, attempts to establish a communication channel with an alternative person associated with the same role identifier.

10. A communications system as claimed in claim 1, further comprising third storage means for storing data for facilitating a particular functional role, wherein the processing means is able to access said data and pass said data, via an established communications channel to a person fulfilling said particular functional role.

11. A communications system as claimed in claim 1, wherein the first storage means comprises at least one record having a plurality of role identifiers and a team field for storing a team identifier, the input means is adapted to accept a request in the form of a team identifier for communication with a plurality of people, and the processing means is adapted to accept a team identifier, access said first and second storage means, and establish communications channels with people able to fulfill each of the functional roles identified by the role identifiers associated with the input team identifier.

12. A communication system as claimed in claim 1, wherein the processing means is configured to accept two linked role identifiers, to establish a communications channel with a person able to fulfill the functional role associated with one of the linked role identifiers, and to pass the second linked role identifier along said communications channel.

13. A communications system as claimed in claim 1, wherein the communication channel established is a data communications channel.

14. A communications system as claimed in claim 1, wherein the communications channel established is a voice communications channel.

15. A communications system as claimed in claim 1, wherein the communications channel established is both a data and a voice communications channel.

16. A communications system as claimed in claim 1, wherein the communications channel established is a GSM (Global System for Mobile Communications) communications channel.

17. A communications system as claimed in claim 1, wherein the communications channel established supports GSM (Global System for Mobile Communications) Short Message Service.

18. A communications device for use with a communications system according to claim 1, the communications device having:

means for wireless communication with said communications system, means for establishing both a data and a voice communications channel with said communications system, means for accepting a role identifier, input by a user, and display means for displaying information received from said communications system to a user.

* * * * *